United States Patent
Plante et al.

(10) Patent No.: US 7,665,420 B2
(45) Date of Patent: Feb. 23, 2010

(54) BIRD CAGE

(75) Inventors: Robin Plante, Sainte-Barbe (CA); Marc Lafond, Laval (CA)

(73) Assignee: Rolf C. Hagen, Inc., Montreal (CA)

( * ) Notice: Subject to any disclaimer, the term of this patent is extended or adjusted under 35 U.S.C. 154(b) by 656 days.

(21) Appl. No.: 11/513,799

(22) Filed: Aug. 31, 2006

(65) Prior Publication Data

US 2006/0288952 A1    Dec. 28, 2006

Related U.S. Application Data

(60) Continuation-in-part of application No. 11/195,442, filed on Aug. 2, 2005, now Pat. No. 7,093,564, which is a continuation of application No. 10/793,157, filed on Mar. 4, 2004, now Pat. No. 6,923,143, which is a division of application No. 10/140,722, filed on May 7, 2002, now Pat. No. 6,715,445.

(60) Provisional application No. 60/714,191, filed on Sep. 2, 2005.

(51) Int. Cl.
    *A01K 31/08* (2006.01)
(52) U.S. Cl. .................. 119/463; 119/461; 119/474; 119/498
(58) Field of Classification Search ............... 119/461, 119/462, 469, 432, 463, 464, 470, 452, 453, 119/454, 459, 472, 473, 474, 475, 478, 479, 119/482, 498
    See application file for complete search history.

(56) References Cited

U.S. PATENT DOCUMENTS

| 2,178,117 | A | * | 10/1939 | Hillenek ............... 119/459 |
| 3,698,360 | A |   | 10/1972 | Rubricius |
| 3,747,567 | A |   | 7/1973  | De Smit |
| 3,896,766 | A |   | 7/1975  | Martin |
| 4,016,833 | A |   | 4/1977  | Ray |
| 4,450,788 | A |   | 5/1984  | Niki |
| 4,577,589 | A |   | 3/1986  | Voss et al. |
| 4,763,606 | A |   | 8/1988  | Ondrasik, II |
| 4,770,127 | A |   | 9/1988  | Volk |
| 4,819,582 | A |   | 4/1989  | Lichvar |
| 4,821,678 | A |   | 4/1989  | Atchley |
| 4,909,188 | A |   | 3/1990  | Tominaga |
| 4,991,544 | A | * | 2/1991  | Galvin et al. ............... 119/469 |
| 5,000,121 | A |   | 3/1991  | Daily |
| 5,010,848 | A |   | 4/1991  | Rankin |
| 5,201,278 | A |   | 4/1993  | Hehn |
| 5,353,738 | A |   | 10/1994 | Chiu |

(Continued)

*Primary Examiner*—Yvonne R. Abbott
(74) *Attorney, Agent, or Firm*—Wolf, Greenfield & Sacks, P.C.

(57) ABSTRACT

A bird cage having a wire grille upper portion and a base assembly. A portion of the base assembly may be made of a light impervious material such as a transparent or translucent material. A plurality of connectors may be used to secure the wire grille panels together. In one embodiment, the footprint of the base assembly is larger than the footprint of the wire grille upper portion of the cage. One or more feeding stations may be provided inside of the cage with a door located on the cage to access the feeding stations. The feeding stations may be arranged in a locked position such that a bird inside the cage cannot tip over or spill the contents of a feeding station.

19 Claims, 12 Drawing Sheets

U.S. PATENT DOCUMENTS

| | | |
|---|---|---|
| 5,435,265 A | 7/1995 | Yasuhiro |
| 5,452,681 A | 9/1995 | Ho |
| 5,533,466 A | 7/1996 | Kohus |
| 5,544,619 A | 8/1996 | Braun |
| 5,549,073 A | 8/1996 | Askins et al. |
| 5,626,098 A | 5/1997 | Askins et al. |
| 5,694,884 A | 12/1997 | Eicoff |
| 5,749,321 A | 5/1998 | Ikuse et al. |
| 5,778,594 A | 7/1998 | Askins et al. |
| 5,845,432 A | 12/1998 | Tully et al. |
| 5,957,086 A | 9/1999 | Gallardo |
| 6,129,052 A | 10/2000 | Huang |
| 6,192,834 B1 | 2/2001 | Kolozsvari |
| 6,230,655 B1 | 5/2001 | Cohen et al. |
| 6,269,775 B1 | 8/2001 | Watts |
| 6,550,424 B1 | 4/2003 | Gao |
| 6,681,720 B1 | 1/2004 | Skurdalsvold et al. |
| 6,715,445 B2 | 4/2004 | Plante |
| 6,832,580 B2 | 12/2004 | Marchioro |
| 6,883,464 B2 | 4/2005 | Kirch |
| 6,923,143 B2 | 8/2005 | Plante |
| 7,093,564 B1 | 8/2006 | Plante |
| 2004/0016407 A1 | 1/2004 | Axelrod |
| 2005/0056230 A1 | 3/2005 | Gao |

\* cited by examiner

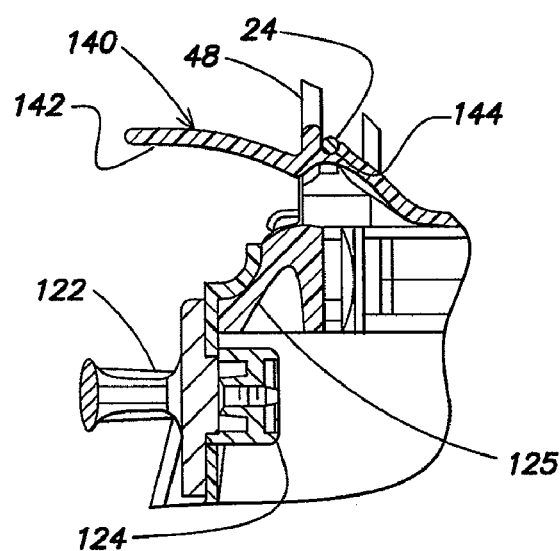
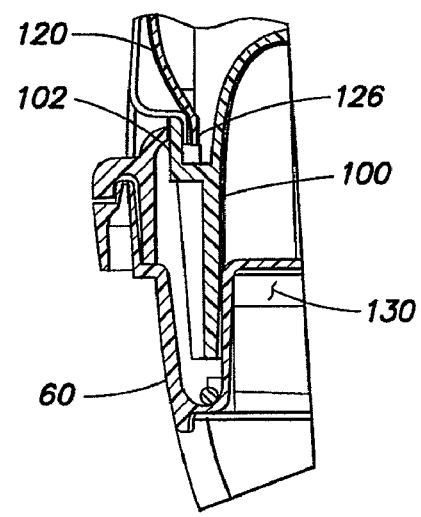
FIG. 13   FIG. 14
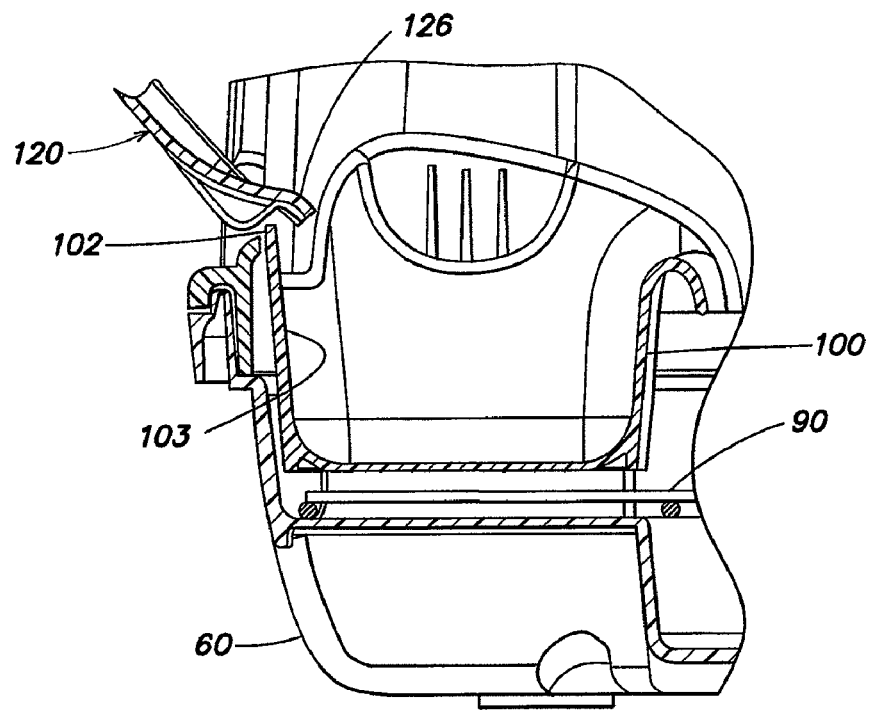
FIG. 15

BIRD CAGE

RELATED PRIOR APPLICATIONS AND PATENTS

This application claims priority based upon prior provisional application Ser. No. 60/714,191 filed Sep. 2, 2005. This application also claims priority upon and is a continuation-in-part of application Ser. No. 11/195,442 filed Aug. 2, 2005, which is a continuation of application Ser. No. 10/793,157 filed Mar. 4, 2004 (now U.S. Pat. No. 6,923,143 issued Aug. 2, 2005) which is a division of application Ser. No. 10/140,722 filed May 7, 2002 (now U.S. Pat. No. 6,715,445 issued Apr. 6, 2004). All of said patents and applications are incorporated by reference in their entirety.

FIELD OF THE INVENTION

This invention relates to bird cages and more particularly to aspects of cages that provide substantial advantages over the cages of the prior art. Various aspects of the present invention are briefly described in this introduction with references to the prior art.

SUMMARY OF INVENTION

In accordance with one aspect of this invention, a bird cage is designed to retain a very high percentage of waste generated by the bird or birds in the cage rather than allowing the waste to be ejected from the cage into the surrounding area. This is accomplished by means of a special cage base assembly that includes a lower peripheral configuration that prevents the waste from flying out of the cage as the bird flaps its wings and flies about in the cage.

In accordance with another aspect of the present invention, the base assembly of a cage includes a unique configuration to cause all of the waste generated in the cage to drop into the base assembly. In one embodiment, this is achieved by making the base with a greater area than the foot print of the upper living space within the cage. This arrangement prevents the waste from being ejected from the cage onto the floor. In one embodiment, at least a portion of the base is removable so that the owner of the cage need only disconnect a portion of the base from the rest of the cage to clean the cage and dispose of waste.

Another aspect of the present invention is to configure the cage so that the birds in it may be seen clearly from any angle, either through the wire grilles that define the sides of the cage or through portions of the base assembly that form part of the cage frame. This is accomplished by making portions of the base assembly of light pervious material such as transparent or translucent plastic so that the birds in the cage may be seen clearly through portions of the base assembly. Portions of the base assembly may be curved, such as at the corners, so that it produces a bay window effect. In one embodiment, the wire grilles connect directly to each other so that a vertical frame or column is unnecessary. This construction avoids the prison-like feeling of the typical prior art bird cages which may include bulky and obtrusive frames, while retaining the wire grilles for improved ventilation.

In accordance with another aspect of the invention, feeding stations are provided for the birds which are accessible from the outside of the cage. Feeding doors may be provided in portions of the cage, such as the base assembly so that the owner may easily access the feeding stations from outside of the cage. In accordance with one embodiment, the feeding stations are located on each side of the cage. The feeding stations may be constructed and arranged to interface or engage with portions of the cage to prevent a bird from tipping over and/or spilling the contents of the feeding stations.

The wire grilles which define the sides, front and back of the cage may all be individually removable. In one embodiment, for ease of manufacture, the grilles are all generally rectangular in shape and easily snap in and out of connection with each other. A removable top grille may also be incorporated into the cover assembly of the cage.

Yet another aspect of the present invention resides in the configuration and operation of a wire grille door or doors that may be of maximum width for easy entry and egress for the bird or birds to and from the cage interior. Furthermore, the doors may be mounted so that they may pivot outwardly or inwardly with respect to the cage. When opened outwardly, the wire grille doors may hang close to the side of the cage and not extend outwardly a great distance from the cage. This avoids the likelihood of anyone accidentally hitting the door and either injuring him or herself or damaging the cage. The ability to fold the wire grille door inwardly is particularly advantageous when the bird cage is left open to allow the bird or birds to fly freely in and out of the cage, as the door may provide a convenient landing area inside the cage when the bird returns to the cage. If when standing on the inwardly folded door, the bird creates droppings, the droppings will fall to the base assembly and land in the cage rather than onto the floor.

In accordance with yet another aspect of the present invention, a bottom wire may be provided in the cage, supported in portions of and forming part of the base assembly. By disconnecting a portion of the base assembly from the rest of the cage, the bottom wire may easily be removed for cleaning. In most prior art cages, the bottom wire may be removed only by removing the cover of the cage, which is awkward and requires the removal of the birds and bird cage accessories from the cage.

In accordance with yet another aspect of the present invention, the cage may be expanded so as to increase its capacity. In accordance with one embodiment thereof, this is achieved simply by removing the cover assembly of the cage and mounting an additional set of wire grilles. These wire grilles may include additional feeding stations and doors.

Another aspect of the present invention is the modular construction of the cage which enables it to be shipped and stored in pieces and yet is easy for the consumer to assemble and disassemble. In one embodiment, when disassembled, all of the bird cage components may fit within the base assembly. This configuration is ideal for shipping the bird cage.

In accordance with another aspect of the present invention, a cage may be provided similar to a cage described in U.S. Pat. No. 6,715,455, U.S. Pat. No. 6,923,143, or U.S. patent application Ser. No. 11/195,442, all of which are hereby incorporated by reference in their entirety.

Various embodiments of the present invention provide certain advantages and overcome certain limitations of prior cages. Not all embodiments of the invention share the same advantages, and those that do may not share them under all circumstances. Further, the elements of a particular cage embodiment described herein may be arranged in any suitable combination to provide a different embodiment, as the present invention is not limited in this respect.

BRIEF DESCRIPTION OF DRAWINGS

The foregoing and other objects and advantages of the invention will be appreciated more fully from the following drawings, wherein like reference characters designate like features, in which:

FIG. 13 is an enlarged detailed view of the area encircled by arrow 13-13 in FIG. 12;

FIG. 14 is an enlarged detailed view of the area encircled by arrow 14-14 in FIG. 12;

FIG. 15 is a view similar to FIG. 14 illustrating the feeding station door in an open position;

DETAILED DESCRIPTION

Figure 1:
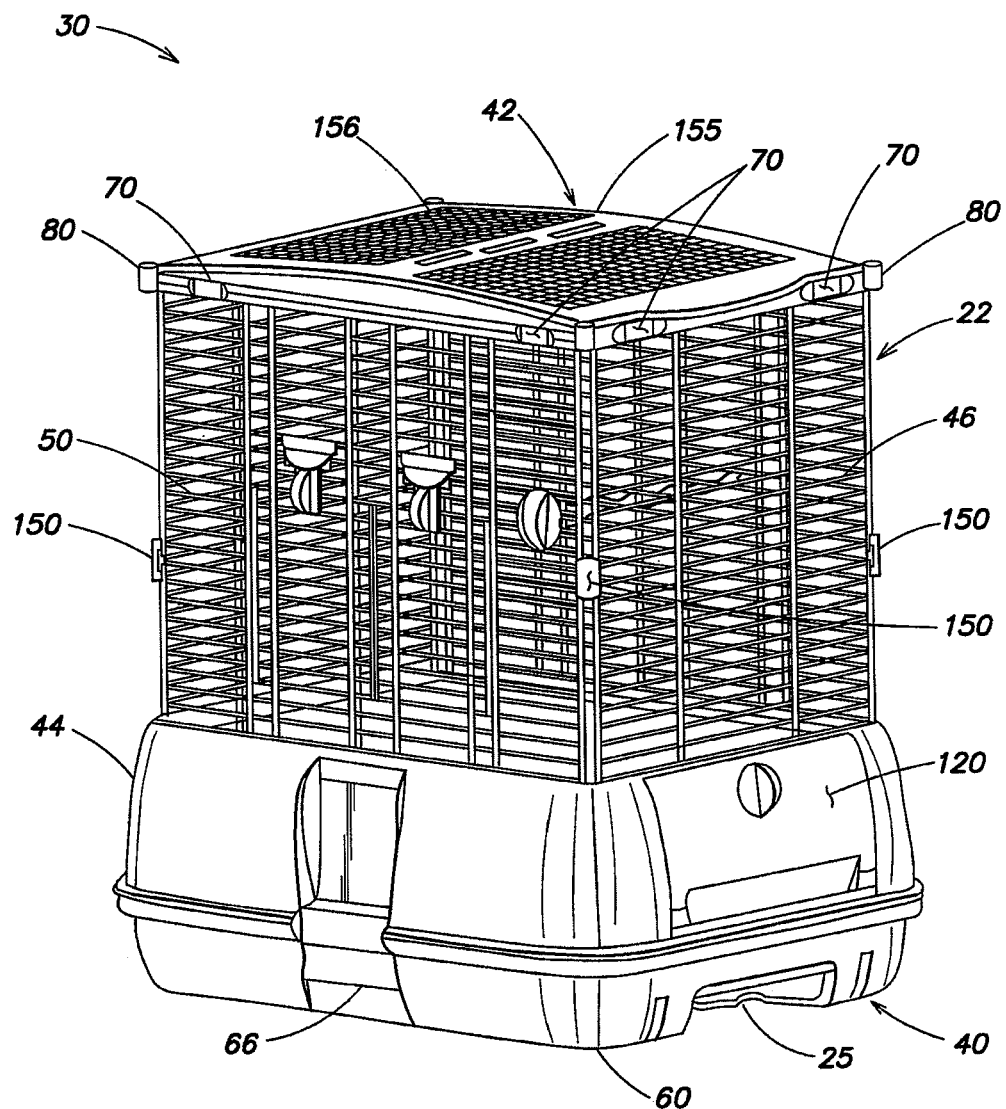
FIG. 1 is a perspective side view of a bird cage according to one embodiment of the present invention.

The knock-down bird cage 30 shown in the drawings includes in its general organization a base assembly 40, cover assembly 42, side grilles 46, back grille 48 and front grille 50. The front grille 50 along with a grille door 52, together with the back and side grilles 46 and 48 enclose the front, back and sides of the cage. The base and cover assemblies 40 and 42 comprise the frame of the cage. The various parts identified above are described in greater detail below.

The base assembly 40 in accordance with one embodiment of the invention shown in detail in FIGS. 1-4 includes a lower base 60, an upper base 44, and a bottom grille 90. In one embodiment, an intermediate grille 136 may also be provided as a landing surface above the bottom grille 90. In the particular embodiment illustrated in FIG. 4, the intermediate grille 136 is removably secured to portions of the upper base 44, and may extend across all or only a portion of the area of the cage 30. However, it should be appreciated that in other embodiments, there may be no intermediate grille 136, as the present invention is not so limited.

Figure 4:
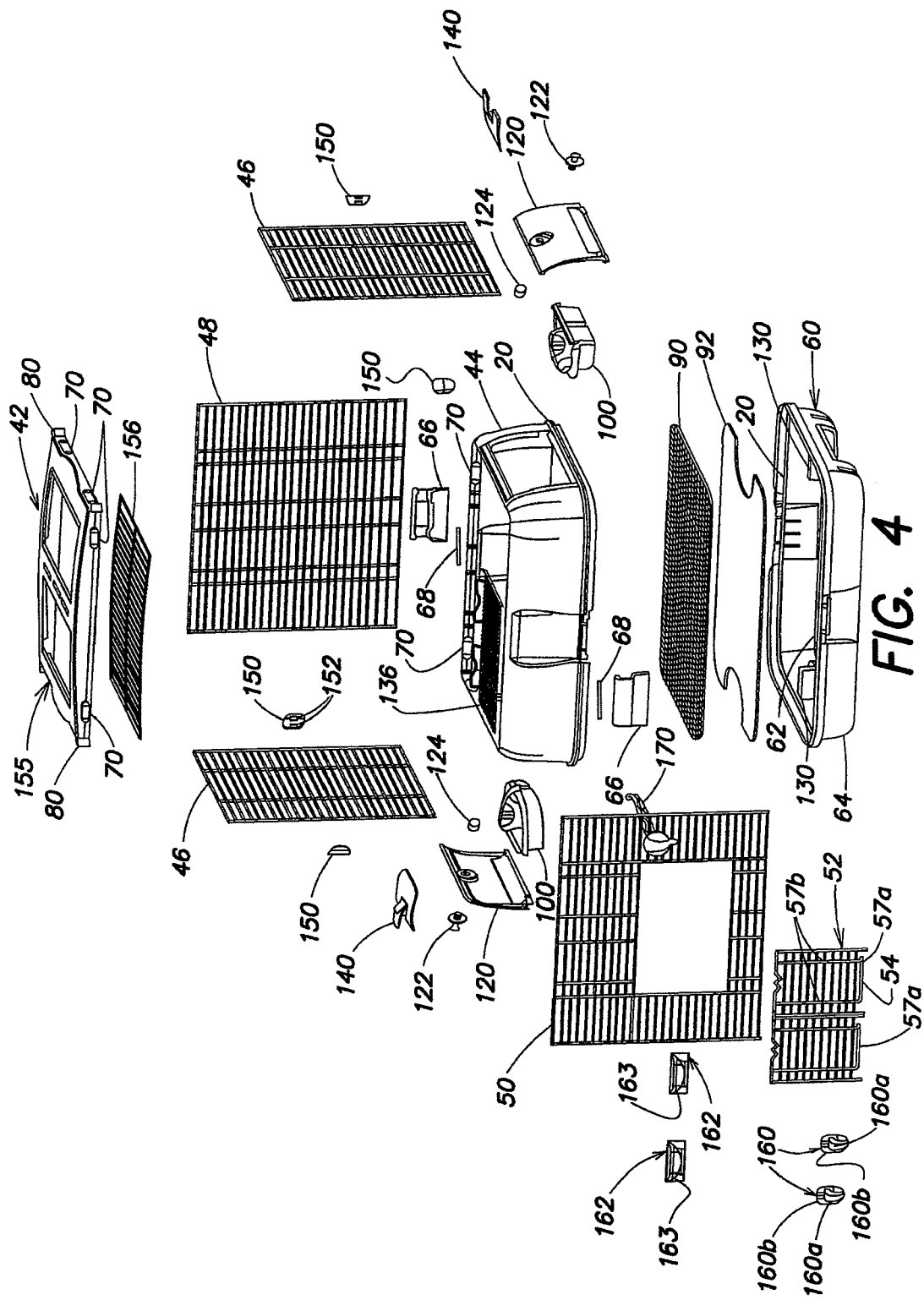
FIG. 4 is an exploded perspective view of the bird cage according to the embodiment of FIG. 1.

The lower base 60 has a bottom wall 62 and a side wall 64 that extends up about the sides, front, and rear of the bottom wall 62. The upper base 44 is positioned above the lower base 60 and as shown in FIG. 4, the upper base 44 may extend about the entire perimeter of the cage 30. In one embodiment, the upper base 44 sits on the lower base 60 with the upper edges of the lower base side wall 64 and the lower edges of the upper base 44 engaging one another. As shown in FIG. 4, the upper base 44 and/or the lower base 60 may be provided with a flange or lip 20 to interface with each other. Handles may be provided on portions of the base assembly 40, such as on the lower base 60, as illustrated by recessed portions 25 on the sides of the cage in FIGS. 1 and 2. Further, in one embodiment, the cage 30 is designed to include a deep base assembly 40 to accommodate various types of litter accessories.

A locking mechanism may also be provided to secure the upper base 44 to the lower base 60. For example, as shown in FIGS. 1, 3, 4, 6, and 17 one or more pivoting latches 66 may be located on the base assembly to selectively engage portions of the lower base 60 with portions of the upper base 44. In one embodiment, locking mechanisms, such as the pivoting latch 66 are located on both the front and rear sides of the cage 30, and each may pivot about a latch pin 68. The latches 66 each carry a pair of flanges 67 that extend under the lip of the lower base 60 to hold the upper and lower base members 44 and 60 when the latches are in the closed position. The latches 66 can readily be opened as they extend below the flanges 67 and are spaced from the side wall 64 of the base and provide room for the fingers to grasp and pivot the latches on their pins 68 causing the fingers to release the lip of the lower base 60. Of course in other embodiments, other types of locking mechanisms may be used, such as rotating knobs, snaps, etc. The present invention is not limited in this respect. As described in further detail below, in some embodiments, the lower base 60 is configured to be removable from the rest of the cage 30 for cleaning the cage.

Figure 16:
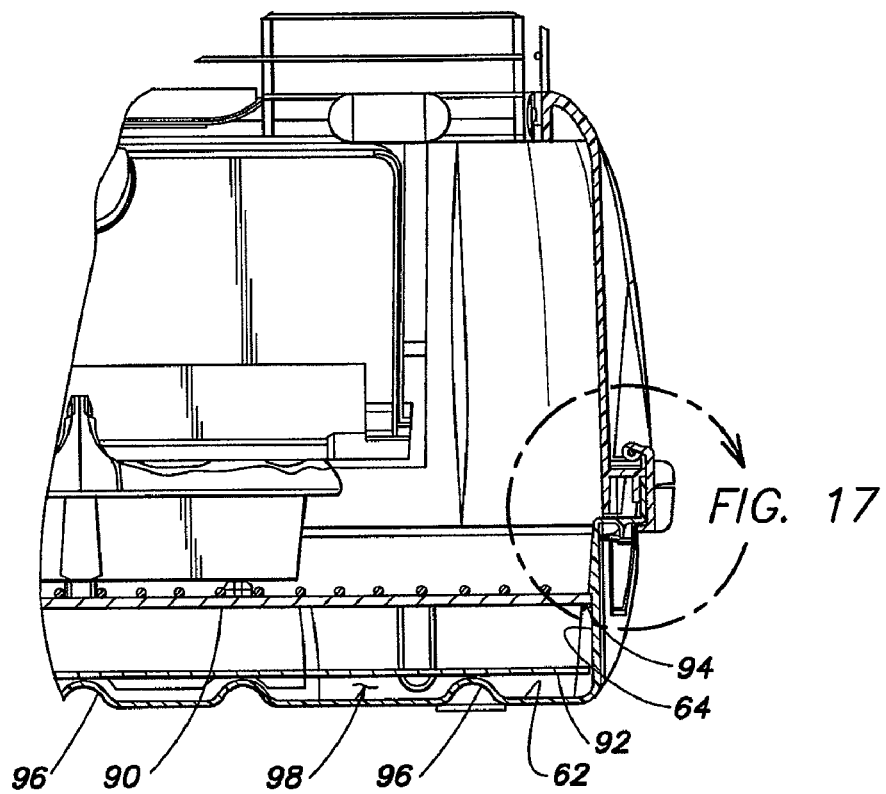
FIG. 16 is a cross sectional view of the base assembly latch in the locked position, taken along section line 16-16 of FIG. 5.
Figure 17:
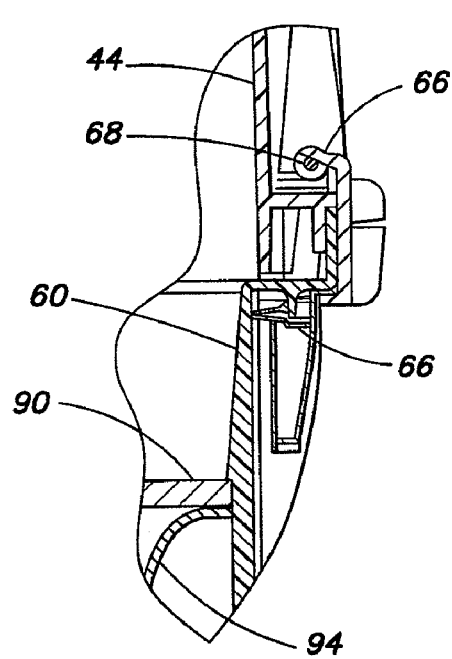
FIG. 17 is an enlarged detailed view of the area encircled by arrow 17-17 in FIG. 16.

In accordance with one embodiment of the present invention, the bottom grille 90 rests within the lower base 60, and may be positioned above the bottom wall 62 of the lower base 60. In one embodiment, as illustrated in FIGS. 16-17 the bottom grille 90 rests on flanges 94 in the lower base, that protrude in from the side wall 64 and/or up from the bottom wall 62. The bottom grille 90 may be composed of a series of parallel wires extending side to side in the cage 30, and joined together by cross wires that extend from front to back. The wire bottom grille 90 is releasably retained in an assembled position in the lower base 60. In one embodiment, flanges 94 are located in the lower base 60 at both the sides thereof, and may also be provided at the front and rear sides as well. As described in further detail below, in one embodiment, portions of the base 40 protrude upwardly and/or outwardly from the base assembly to support the wire bottom grille 90 and feeding stations 100. However, it should be appreciated that in another embodiment, the bottom grille 90 may rest on other surfaces, as the invention is not so limited. For example, in one embodiment, the bottom grille may rest on a surface of the bottom wall 62. In another embodiment, the bottom grille may rest under the feeding stations or seat cups (which are described in greater detail below). Furthermore, in some embodiments, the bottom grille may be removed from the cage.

In some embodiments of the invention, a liner 92 is placed within the lower base 60 to make cleaning of the cage 30 easier. In those embodiments, most of the bird waste accumulates on the liner 92 rather than on portions of the base assembly 40. Therefore, when cleaning the cage 30, most of the waste may be removed from the cage 30 by simply replacing the liner 92. The liner 92 may, for example, be made of a paper material, such as corrugated cardboard. In one embodiment, the liner may include a corrugated cardboard material with a coating, such as varnish, on one side to prevent the liner from crinkling when wet. To prevent a wet liner from soaking the bottom wall 62 of the lower base 60, to create an environment in which the liner 92 will dry more quickly, and/or to extend the liner's usefulness, the bottom wall 62 of the lower base 60 may be provided with raised ribs 96 (see FIG. 16) so as to form air pockets 98 beneath the liner 92 when placed on top of the bottom wall 62. As shown in FIG. 4, the liner may be shaped to conform to that of the base assembly. As also shown in FIG. 4, the liner 92 includes cutouts at its ends to accommodate the regions of the feeding stations 100.

In one embodiment, the design of the base assembly 40 is intended to prevent bird waste from being ejected out of the cage when a bird or birds move about the cage. The upper base 44 rests on top of the lower base 60, and the periphery of the upper base 44 and/or the lower base 60 is larger than the periphery of the upper wire portion 22 of the cage 30. For example, as illustrated in the top view shown in FIG. 5, the footprint of the base assembly 40 is greater than the footprint of the upper wire portion 22 of the cage 30. Waste propelled about the cage which hits the sidewalls of the base assembly 40 will remain in the base assembly 40 rather than be ejected out of the cage and onto the floor or other surrounding surface. Portions of the base assembly 40 act as a debris guard to help retain waste inside the cage 30. The inwardly inclined peripheral wall of the upper base 44 and the outwardly inclined peripheral wall 64 of the lower base member are particularly effective in this regard.

The upper base 44 may be made of a plastic material, and in one embodiment, may be made of a transparent material such as polystyrene, or some other light pervious suitable material, either transparent, or translucent, to enable observers to view the birds without wire grilles interfering with the view and also allowing birds inside the cage to see through the upper base 44 to the surrounding area. The plastic material may also be tinted. In one embodiment, the upper base 44 has a curved outer shape sloping down to the lower base 60. Further, in one embodiment, the corners of the upper base 44 are curved to provide a bay window effect, increasing visibility into the cage 30.

The lower base 60 may also be made of a transparent or translucent material or esthetically it may be made of an opaque material, since the lower base 60 forms the bottom of the cage 30 where waste collects.

The cover assembly 42 may be generally square or rectangular in shape, although the present invention is not limited to a particular sized or shaped cage 30. In one embodiment, the cover assembly 42 includes one or more top grilles 156 to increase ventilation. As described in further detail below, the top grilles 156 may snap into position in the frame 155 of cover assembly 42. In other embodiments, the cover assembly 42 may include a wire grille extending across the entire top of the cage, similar to the wire grille panels 46, 48, 50, which form the sides of the cage 30.

The cover assembly 42 may also include connectors 70 to engage the top portions of the side, back and front grilles 46, 48, 50 when the cage 30 is assembled. As shown in FIGS. 1-4, and 20, in one embodiment, the connectors 70 include protrusions that snap in between two adjacent parallel wires in the top of the grilles. For example, in the embodiment illustrated in FIG. 20, the connectors 70 include notches 72 on both the top and bottom thereof, shaped to receive adjacent wires 24, 26 from one of the wire grilles 46, 48, 50. The connectors 70 include a head 74 on a stem 76 that snap-fits between adjacent wires as the wires are engaged by the notches 72. The stem 76 and head 74 of the connectors preferably are horizontally elongated as to provide additional stability to the connection with the grilles. It should also be appreciated that the head 74 of the connector 70 may be rounded, curved, flat, etc. The spacing between the notches 72 defined by the stem 76 is approximately equal to the spacing between the wires 24, 26. The head 74 is larger in a vertical direction than the spacing between the wires 24, 26 so that once a grille is snapped into the cover assembly 42 the two components will not separate until they are forcibly separated. The placement of the connectors 70 about the cover assembly may vary, but in the embodiment shown, two connectors 70 are provided on each side of the cover assembly 42, as shown in FIGS. 1-4.

Similar connectors 70 may also be provided on the base assembly 40 to fasten the lower portions of the wire grilles 46, 48, 50 to the base assembly 40, as shown in FIGS. 4, 6, 7, and 12. In this particular embodiment, the connectors are located on the upper base 44.

As shown in FIGS. 1-5, the cover assembly 42 may also include corner pieces 80 that protrude outwardly at the corners of the cover assembly 42. These corner pieces 80 may assist in stabilizing and positioning the wire grilles by engaging the vertical edges of the grilles and spacing them apart a small predetermined distance for alignment purposes.

Figure 18:
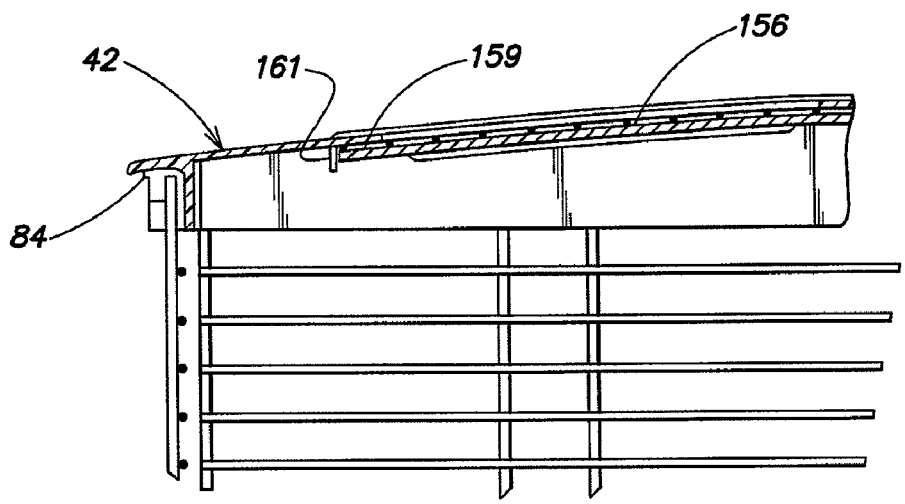
FIG. 18 is a cross sectional view of a portion of the cover assembly according to yet another embodiment of the present invention.
Figure 19:
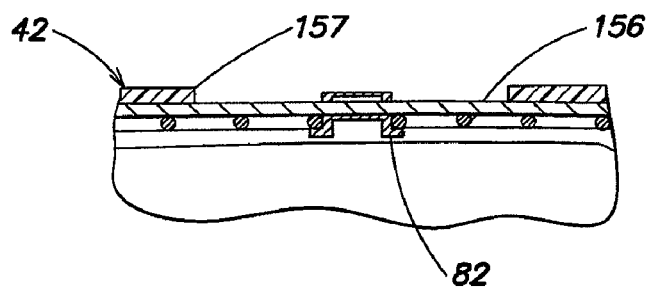
FIG. 19 is a cross sectional view taken along section line 19-19 of FIG. 5.
Figure 20:
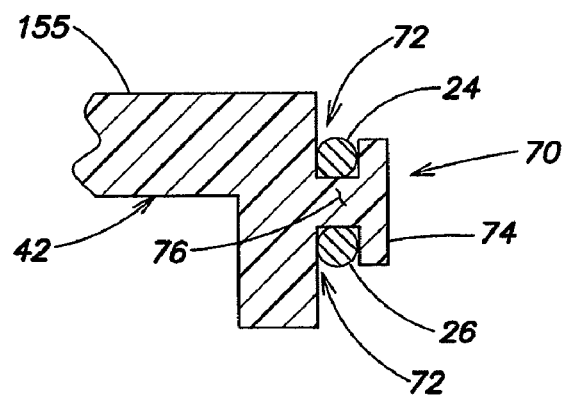
FIG. 20 is a cross sectional view of a portion of the cover assembly according to another embodiment of the present invention.

As mentioned above, the cover assembly may include a top grille 156 to increase the ventilation and visibility in the cage 30. As shown in FIG. 19, in one embodiment, connectors 82 similar to the connectors 70 may be provided in center span 157 of the frame 155 of cover assembly 42 to attach the wire grille 156 and frame 155. In the embodiment illustrated the frame 155 is bowed downwardly slightly, which may force the ends 159 of the grille 156 to bear firmly against the end portions 161 of the frame (see FIG. 18), and remain fixed without the use of connectors at the ends. However, connectors may be provided at the ends 159 of the frame as well. The connectors 82 may provide a snap-fit so that the top grille 156 is held firmly in place. The top grille 156 enhances ventilation of the cage, provides a landing area for birds when let out of the cage to fly about a room, and provides a climbing surface for birds inside the cage 30.

Figure 5:
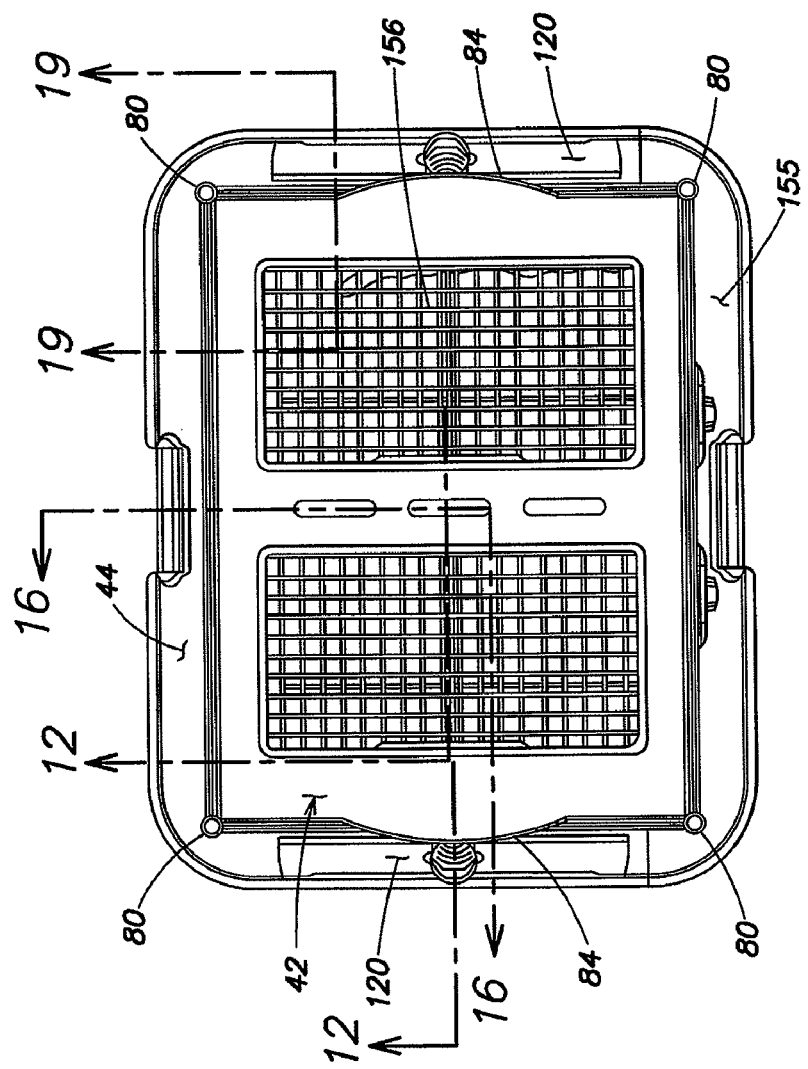
FIG. 5 is a top plan view of the bird cage according to the embodiment of FIG. 1.
Figure 6:
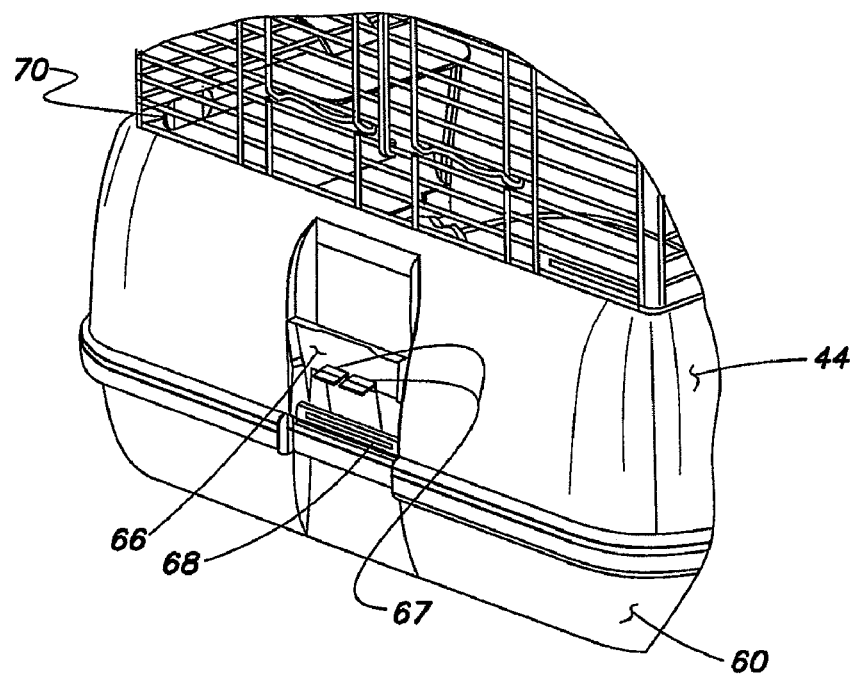
FIG. 6 is a detailed perspective side view of a latch in an open position on a bird cage, according to another embodiment of the present invention.

Handles 84 may also be provided on the cover assembly 42. As shown in FIGS. 5 and 18, the handle may be provided at opposite ends 161 of the frame 155. The frame 155 of cover assembly 42 is preferably made of a molded plastic such as a polystyrene or other suitable material like that of the base assembly 40. The cover frame 155, including connectors 70, 82, corner pieces 80, handles 84, and top grille 156 may be formed as a unitary structure, or alternatively, the parts may be separately fabricated and assembled together. In other embodiments, all or a majority of the cover assembly parts may be made as a wire grille of various metals and/or plastics.

According to one embodiment of the present invention, the cage 30 does not require a vertical frame and/or column-like structure at the corners of the cage to secure the wire grilles 46, 48, 50 together. Instead, corner connectors 150 may be provided, as illustrated in FIGS. 1-4 to secure the wire grilles together. In some embodiments, corner connectors 150 may not be required, particularly in shorter frame configurations. However, in some embodiments, a corner connector 150 may be provided in each corner of the cage 30, to secure adjacent vertical edges of the side panels, usually at their vertical midportion, together. In one embodiment, each corner connector 150 includes one or more hooks shaped to engage the vertical edges of adjacent wire grilles 46, 48, 50 so that the two adjacent grilles are secured together in a snap fit relationship. In one embodiment, the outer surface of a corner connector 150 is smooth and rounded, as shown in FIGS. 1-4. It should be appreciated that in other embodiments, various other types of connectors, such as brackets, clips, hangers, and snap fasteners may be used to secure each wire grille both to the cover assembly, base assembly, and an adjacent wire grille.

Figure 3:
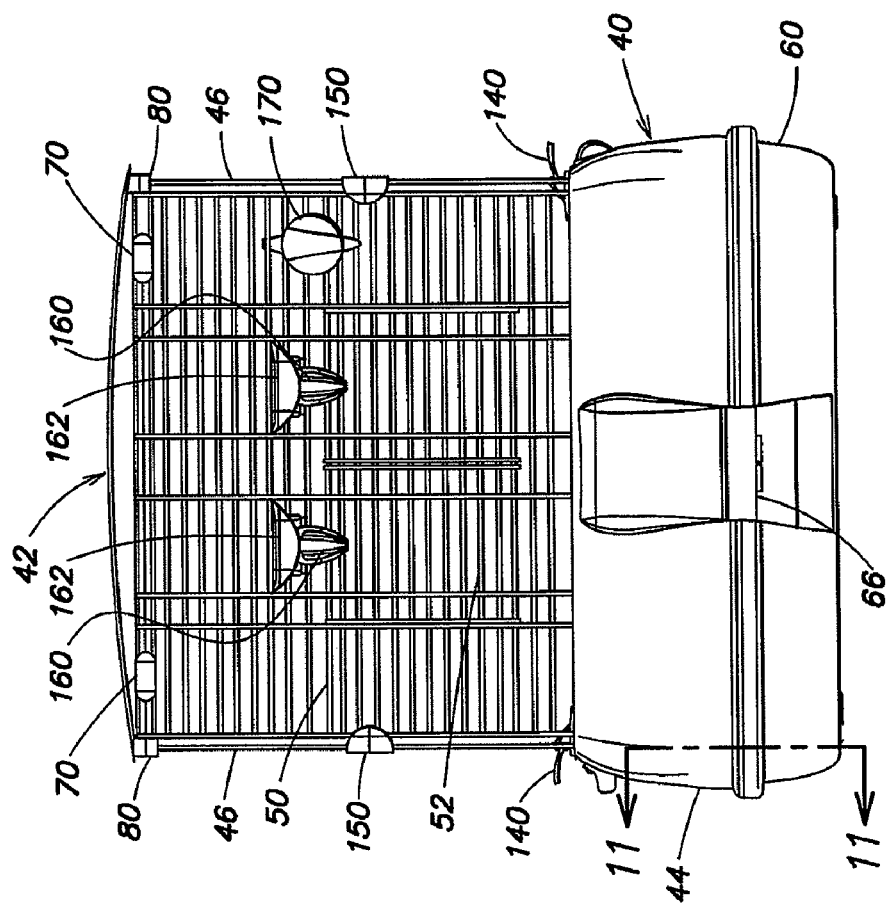
FIG. 3 is a front view of the bird cage according to the embodiment of FIG. 1.
Figure 2:
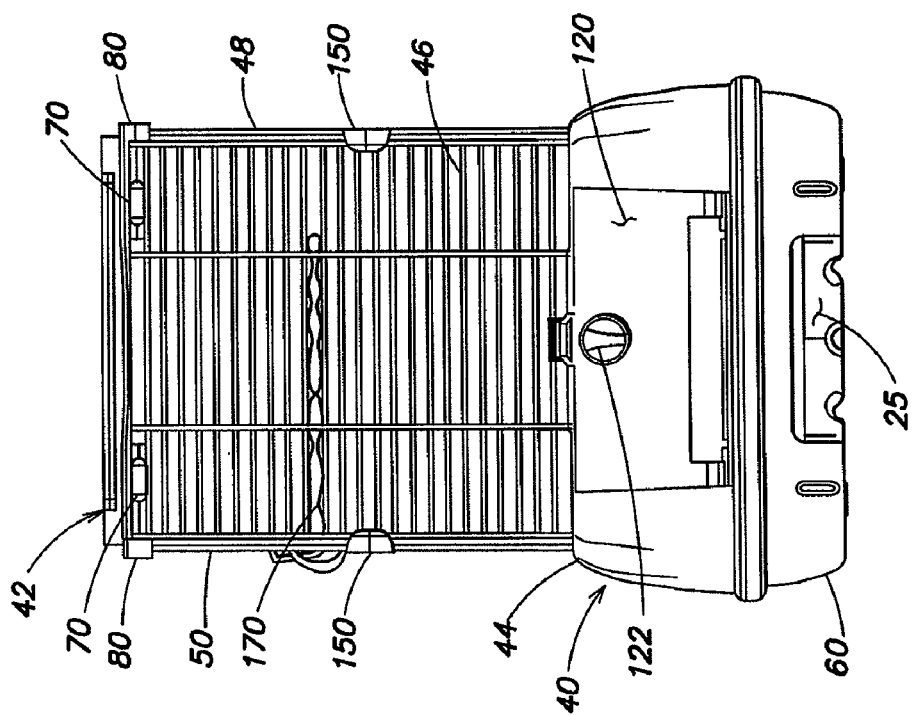
FIG. 2 is a side view of the bird cage according to the embodiment of FIG. 1.

The front grille 50 includes at least one door grille 52 for permitting easy entry and egress of birds. Two door grilles 52 are shown in the embodiment of FIGS. 1-3. The door grille 52, in accordance with one embodiment of the invention, is pivotally supported so that it may move from the closed vertical position of FIGS. 1-3 to an open position disposed either approximately horizontally either inside or outside the cage, or hanging downwardly outside the cage 30. When the door is disposed inside the cage 30, it may provide a landing platform for birds as they enter the cage 30. As shown in FIG. 4, in one embodiment, the lower portion of the door 52 may be provided with a stop 54 to minimize rotation of the door when the door is rotated into the cage. For example, in one embodiment, the stop 54 is an L-shaped extension 57*a* joining the lower ends of the two inboard vertical wires 57*b*. The extension engages the horizontal wire of the front grille 50 below the wire that defines the bottom of the door opening 53, when the door is disposed horizontally inside the cage. The L-shaped extension 57*a* does not prevent the door from pivoting outwardly of the cage and folding down, to near a vertical plane against the grille and/or the base assembly 40.

A locking assembly may be provided to secure each door 52 in a closed position. In one embodiment, the locking assembly includes a knob 160 and a catch 162, as illustrated in the embodiment of FIGS. 1-4. The knob 160 is rotatably mounted on the door grille 52 and includes a handle 160*a* and flange 160*b* attached to and rotatable with the handle. The catch 162 is fixed to the wire grille 50 and has a slot 163 parallel to the plane of the grille and in the plane of the flange when the door is in the closed position. By turning the knob the flange may be moved into and out of the slot to lock or release the door. In one embodiment, a plurality of doors 52 are provided, and the doors 52 may be adjacent to each other such that they form a larger opening when both doors are in an open position.

According to another aspect of the invention, one or more feeding stations or seat cups 100 are provided within the cage 30. Each feeding station 100 is provided with one or more compartments for holding food and/or water. As shown in the embodiment illustrated in FIG. 11, a feeding station may include two compartments 100*a* and 100*b*, with a divider 134 separating them. It should be appreciated that in other embodiments, more or fewer compartments may be provided in one feeding station 100, as the present invention is not limited in this respect.

With prior bird cage designs, it is not uncommon for a bird to knock over and/or spill the contents of a container holding food and/or water in its cage. Therefore, in one embodiment of the present invention, the feeding station 100 may be locked in a position to prevent the feeding station 100 from being tipped or knocked over. This reduces the amount of waste collected at the bottom of the cage 30. As explained in further detail below, in one embodiment, portions of the cage 30 may engage portions of the feeding station 100 to selectively lock the feeding station in position within the cage.

As illustrated in FIGS. 1, 2, 4, and 7, a feeding station door 120 may be provided to afford easy access to a feeding station 100 inside of the cage 30 without having to open the front door grille 52 or the cover assembly 42. In one embodiment, a door 120 is provided on each side of the cage 30. The door 120, for example, may be provided in the base assembly 40, such as the upper base portion 44. Each feeding station door 120 may be provided with a door lock that includes a knob 122 on the outside of the door 120 and a catch 124 on the inside of the door 120. The catch 124 turns between a locked position wherein it engages the edge 125 of the upper base member 44 and an unlocked position wherein it releases the edge 125. The knob enables the catch to be readily moved between the locked and unlocked position from outside the cage (see FIGS. 13 and 14). The feeding station door 120 provides easy access to the cage interior for cleaning, and replenishing the supply of seed and water, and further provides accessibility to bird cage accessories, such as a perch 170 which is explained in greater detail below.

Figure 11:
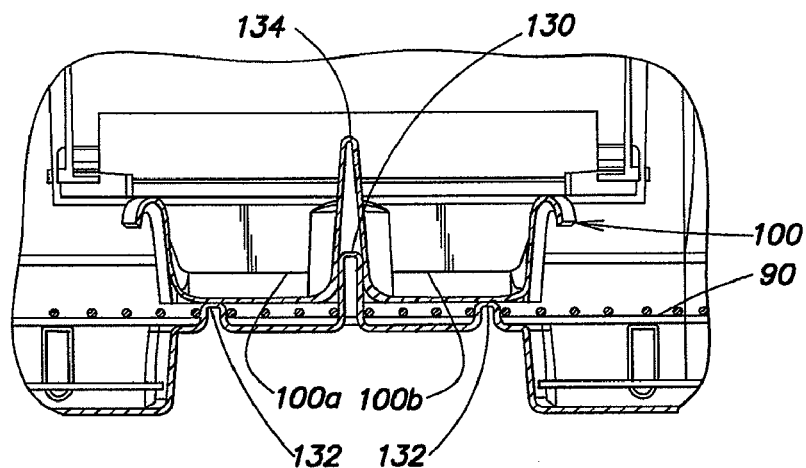
FIG. 11 is a cross sectional view taken along section line 11-11 of FIG. 3.

Portions of the bird cage 30, such as the base assembly 40 may be provided with feeding station supports 130 and 132. In the embodiment of FIG. 11 the support 130 locates the feeding station 100 adjacent the door 120, but may serve to do so in other locations in the cage as well. The supports 132 provide a level platform for the feeding station. In one embodiment, as shown in FIGS. 4 and 11, the feeding station support 130 may be an upwardly extending panel formed as part of the base assembly 40 and may engage the feeding station divider 134. The bottom grille support 132 may also align and/or secure the bottom grille 90 in the base assembly.

As illustrated in FIGS. 14 and 15, in one embodiment, a portion of the feeding station door 120 acts as a locking mechanism to secure the feeding station 100 in place inside the cage 30. For example, as shown in FIG. 14, when the door 120 is closed, the lower portion 126 of the door 120 overlaps the upper portion 102 of the feeding station side wall 103, when the feeding station is mounted on the support 130. In this manner, the feeding station 100 may be rigidly fixed within the cage 30 so that a bird inside of the cage cannot knock it over or tip it and spill its contents. However, as shown in FIG. 15, when the feeding station door 120 is pivoted outwardly to an open position, the lower portion 126 of the door 120 disengages the feeding station side wall 103, and the feeding station 100 may be easily removed from the cage for cleaning, refilling, etc.

Figure 7:
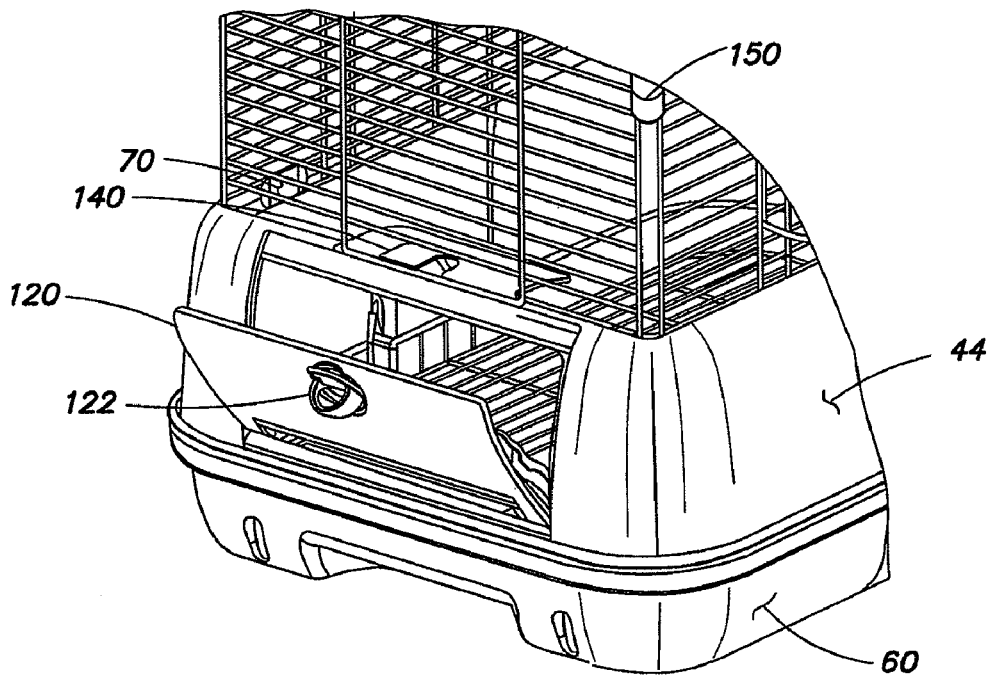
FIG. 7 is a detailed perspective side view of a door on a bird cage according to yet another embodiment of the present invention.
Figure 12:
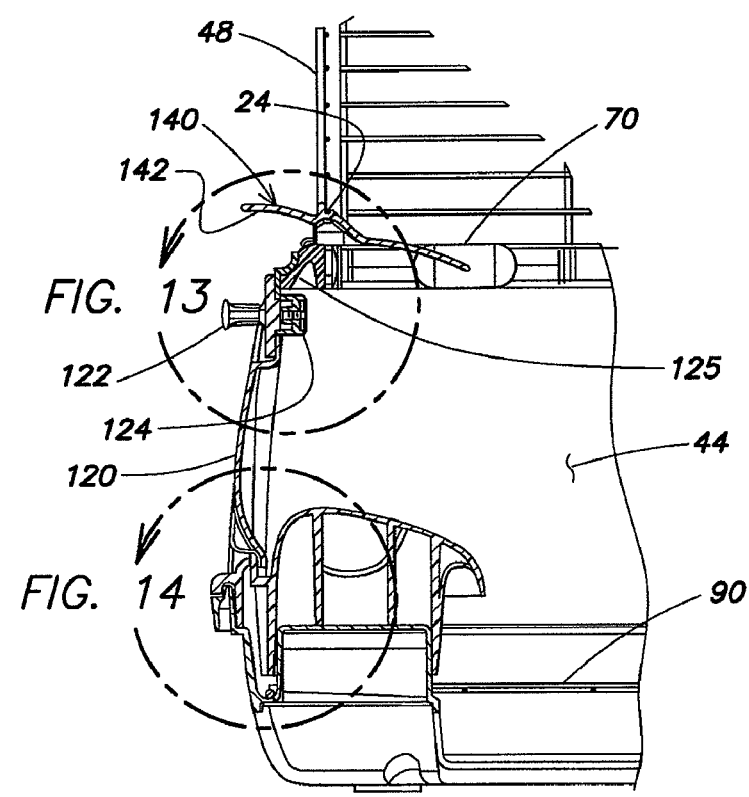
FIG. 12 is a cross sectional view taken along section line 12-12 of FIG. 5.

In some embodiments, a feeding station shield or baffle 140 may be provided as a bird cage accessory. Containers that hold food and/or water in a cage are often placed in the lower portion of the cage 30 so that a bird inside the cage may easily fly down and access the containers. However, when a container is low in the cage 30, it is often susceptible to various debris and waste falling into it, for example, from a bird flying around in the cage. To prevent debris and waste from falling into and contaminating the food and/or water in the feeding station, a feeding station shield or baffle 140 may be provided to overhang the feeding station 100. One example of a feeding station shield 140 is shown in FIGS. 4, 7, 12, and 13. This particular shield or baffle 140 is removably secured to one or more side grilles 46, and is positioned above one or more feeding stations 100. In the embodiment illustrated, a shield 140 is shown mounted on a single side grille 48 to protect a single feeding station. The shield may have a substantially planar configuration, but as shown in FIGS. 4, 7 and 12 in another embodiment, the shield 140 is curved and slopes downwardly to deflect waste beyond the food station beneath it. The feeding station shield or baffle 140 may act as a protective covering without interfering with the accessibility of the station.

The shield 140 may attach to the wire grilles in a variety of ways. In one embodiment, the shield 140 includes a handle 142 that extends out of the cage and includes a notch 144 that latches onto a wire 24 in the wire grille 48, as shown in FIGS. 12 and 13. To clean the shield 140, it may easily be removed by grasping the handle 142 and drawing it outwardly between the wires of the grille, such that it is removable from outside of the cage 30 without needing to open the doors of the cage. This may be advantageous because the act of opening a cage door and/or inserting a hand into the cage may produce undesirable stress on an animal inside of the cage 30. It should be appreciated that in other embodiments, the feeding station shield may be fastened to the cage 30 in other ways.

In one embodiment, the cage 30 may include other types of bird cage accessories, that may be removably secured to portions of the wire grilles, such as by a snap-fit connection with the grille wires. For example, as shown in FIGS. 1-4, one or more perches 170 may be provided on which a bird or birds may stand. As shown in FIGS. 2 and 4, the thickness of the perch 170 may vary along the length of the perch. This allows birds of different size to stand comfortably on the perch. This configuration may also promote circulation and prevent foot problems which may occur when a bird always grips a similarly sized and shaped surface. In one embodiment, as shown in FIGS. 2 and 4, the body of the perch 170 may be shaped somewhat like a bobby pin, that is, the perch is slotted and the side edges of the slots are curved, while the outer surface of the perch is smooth, though tapered, to vary the perch thickness. It should be appreciated that in other embodiments, other types of accessories may be provided that are removably secure to the wire grilles of the cage 30, including planters, mirrors, flowers, toys, etc. One or more of these above-described accessories may attach to wire grilles of the cage and may be removable from the cage similar to the feeding station shield 140 described above.

As described above, in some embodiments, the bird cage 30 is of modular or knock down construction. The cage 30 may include an easy snap-fit assembly, requiring no screws, hooks, or tools for assembly. In this embodiment, essentially all of the various components may be disassembled for shipping and/or storage. In one configuration, all of the above described cage components, when separated, may fit within the base assembly 40. In one embodiment, the lower base 60 may fit upside down within the upper base 44 such that the bird cage 30 may be shipped in a box that is approximately the size of the upper base 44. In some embodiments, certain components, such as the liner 92, may be packaged separately.

When the bird cage 30 is in its disassembled state, it may take only a few steps to fully assemble the cage 30. For example, in the embodiment shown, the liner 92 and the bottom grille 90 are placed within the lower base 60, the upper base 44 is placed on top of the lower base 60, and the latches 66 are snapped into the closed position to secure the base assembly 40 together. The side grilles 46, 48, and 50 are then secured to the connectors 70 located on the base assembly 40. The cover frame 155 and grille 156 are attached together, and the cover assembly 42 is then secured to the tops of the side grilles, all as described above. In some embodiments, corner connectors 150 are also secured at each corner of the cage to secure the side grille panels together. It should be appreciated, that the order of assembly is not confined to the sequence described above. For example, in some embodiments, the side wire grilles may be secured to the cover assembly 42 either before or after the grilles are secured to the base assembly.

When the bird cage is to be cleaned, few steps are required. In one embodiment, as described above, most of the waste that accumulates in the cage 30 will collect in the base assembly 40 due to its configuration. The lower base 60, liner 92, and bottom grille may easily be cleaned by unlatching the upper base 44 from the lower base 60. The top portion of the cage including the upper base, grilles and cover assembly may be removed and placed on a surface, such as a table or on the ground. The bottom grille 90 and the lower base 60 may then be easily cleaned. The liner 92 may also readily be replaced.

Figure 8:
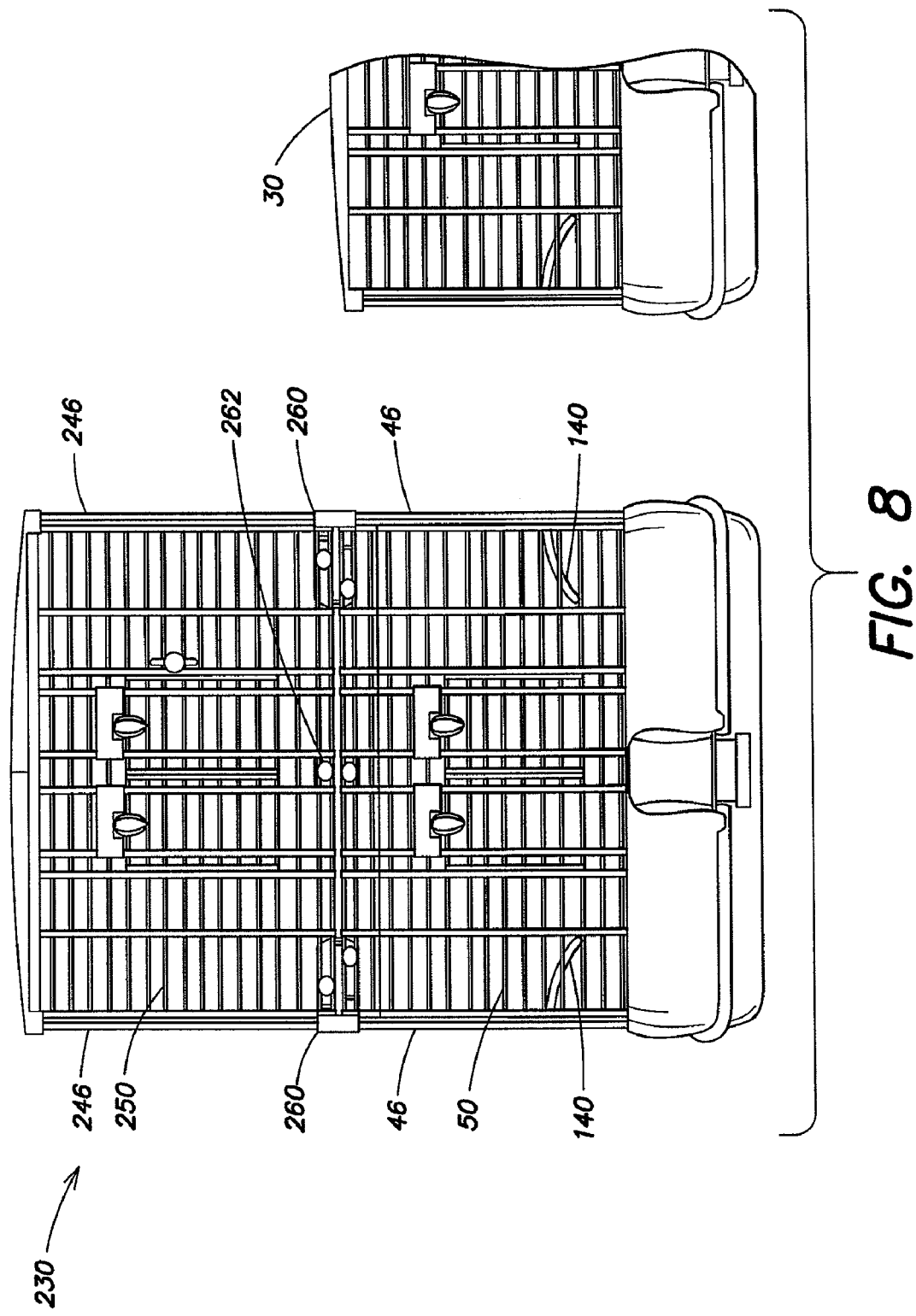
FIG. 8 is a front view of a bird cage according to yet another embodiment of the present invention.
Figure 9:
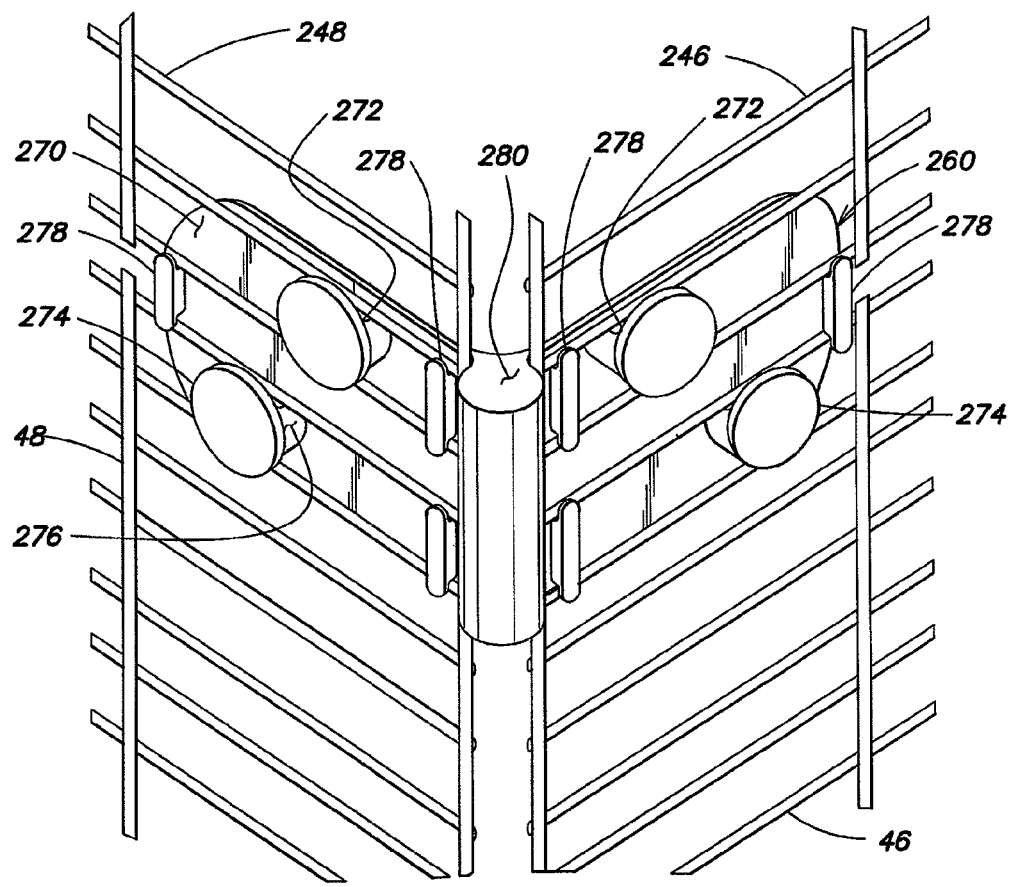
FIG. 9 is a detailed perspective view of a connector for assembling a bird cage according to yet another embodiment of the present invention.
Figure 10:
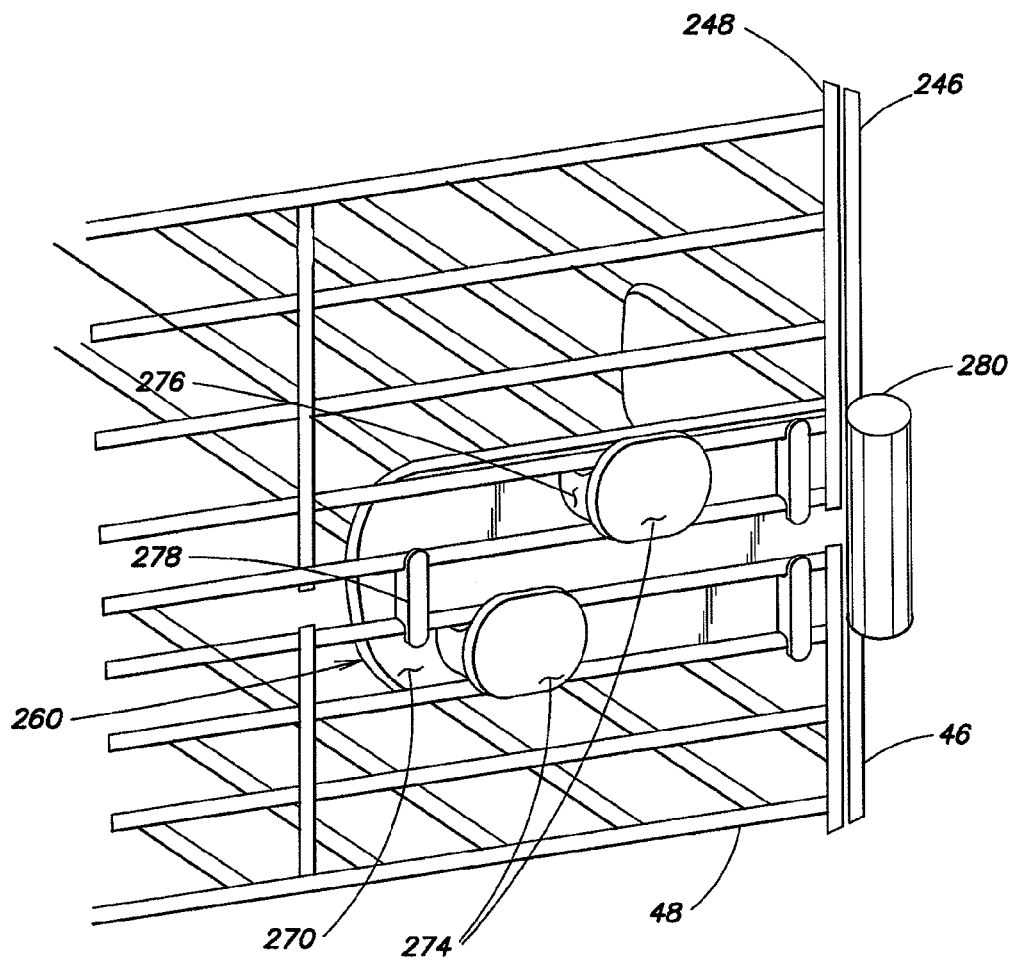
FIG. 10 is another detailed perspective view of the connector illustrated in FIG. 9.

In FIGS. 8-10, another embodiment of a bird cage 230 of the present invention is shown. The bird cage 230 illustrated in FIG. 8 is similar to the cage 30 shown in FIG. 1, except that it includes another series of wire grilles 246, 248, 250 positioned above the wire grilles 46, 48, 50. This configuration increases the height of the cage 230 in comparison to the cage 30. In one embodiment, to connect wire grilles 46, 48, 50 with wire grilles 246, 248, 250, connectors 260, 262 may be employed. FIGS. 9 and 10 illustrate connectors 260 and 262 according to one embodiment of the present invention. Connectors 262 may be similar to connectors 260 except that connectors 262 are substantially planar while connectors 260 are configured with an angle for use at the corners of the cage 230. As shown in FIGS. 9-10, in one embodiment, each connector 260 includes a base portion 270, which may be L-shaped when the connector is intended for use in a corner of a rectangular or square bird cage. It should be appreciated that the connector may be made in other angles for different cage configurations.

As shown in FIGS. 9-10, in one embodiment, the connectors 260 include fasteners that snap in between two parallel wires that form the grilles 46, 48, 246, 248. These fasteners may be similar to the configuration of those employed in the connectors 70 described above. For example, in the embodiment illustrated in FIGS. 9-10, the connectors 260 include notches 272. The notches 272 are defined by stems 276 extending outwardly from the base 270 that carry caps 274 on their ends remote from the base. The notches 272 on each side of the stems face away from one another and are positioned to receive adjacent wires of the grilles. As shown in FIGS. 9 and 10, two rows of fasteners are provided, so that one row may engage the end pair of wires of the two adjacent grilles. In one embodiment, the stems 276 are sized to be slightly less than or approximately equal to the spacing between the wires on the grilles. Each cap 274 is preferably larger than the spacing between the wires on the grilles so that once the grilles are fastened together, they will not accidentally separate. However, the wires may be sufficiently flexible so that they may fit around the caps 274 to both connect and disconnect the wires of the grille to the connectors. The connector 260 may further include one or more spacers 278 to secure the wire grilles together. The spacers 278 assist in maintaining parallel horizontal alignment and spacing of the grilles. The columns 280 at the corners of the L-shaped connectors 260 similarly serve to maintain the alignment and spacing of adjacent grilles.

It should be appreciated that the above-described cages may be used with a variety of different species of birds as well as other animals. For example, in one embodiment, the cage may be used for birds, such as budgies, canaries, lovebirds, and finches.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A bird cage comprising
a lower base member having a bottom wall and an upwardly extending peripheral wall attached to the bottom wall,
an upper base member having a continuous and light pervious side wall and having top and bottom edges defining an open top and bottom, the footprint of the top opening being smaller than that of the bottom opening, said bottom edge being connected to the top of the peripheral wall of the lower base member,
a plurality of grilles having bottom edges connected to the top edge of the upper base member, said grilles together defining an enclosure above the upper base member, said grilles having side edges disposed closely adjacent one another and free of columns between them,
and a top wall connected to the tops of the side grilles and including a top wire grille.

2. The bird cage as described in claim 1 wherein at least one of the side grilles includes a door opening for birds to fly in and out of the cage,
wire grille doors pivotally mounted at their bottom in said door opening enabling the door to be pivoted out of the cage to fully open the door and pivoted into the cage to a horizontal plane to form a landing platform for birds inside the cage.

3. The bird cage as described in claim 1 wherein the top wall and the upper base member carry connectors to engage top and bottom portions of the side grilles enabling the side grilles to be connected to the top wall and upper base member without additional fasteners.

4. The bird cage as described in claim 3 wherein the connectors snap fit between adjacent wires at the top and bottom portions of the side grilles.

5. The bird cage as described in claim 4 wherein the connectors are integrally formed with the top wall and upper base member and engage adjacent wires in the grilles to releasably connect the grilles to the top wall and upper base member.

6. The bird cage as described in claim 1 wherein at least one feeding dish is detachably secured to the bottom wall of the bottom base member adjacent the peripheral wall thereof,
and a door in the upper base member wall adjacent the dish enabling the dish to be filled from outside the cage and enabling the dish to be withdrawn from the cage without removing the top wall or disconnecting the grilles from the upper base member.

7. The bird cage as described in claim 6 wherein a baffle is removably mounted above the dish for shielding the dish from waste falling in the cage.

8. The bird cage as described in claim 6 wherein the door engages the dish when the door is closed to prevent the dish from moving in the cage when said door remains closed.

9. The bird cage as described in claim 1 wherein at least one feeding dish is detachably secured to the bottom wall of the lower base member adjacent the peripheral wall thereof,
and a baffle removably connected to the grille adjacent the dish for shielding the dish from waste falling in the cage.

10. The bird cage as described in claim 1 wherein at least one elongated perch is mounted in the cage, said perch having a smooth outer surface and a width that varies along its length.

11. The bird cage as described in claim 10 wherein the perch is slotted along at least a part of its length with the sides of the slots undulating in a longitudinal direction.

12. The bird cage as described in claim 10 wherein the perch carries a connector formed as an integral part thereof for releasably engaging wires of a grille to mount the perch without the aid of tools or other fasteners.

13. The bird cage as described in claim 1 wherein the height of the upper base member exceeds the height of the lower base member.

14. The bird cage as described in claim 1 wherein the footprint of the upper base member gradually diminishes in an upwardly direction from the bottom to the top edge of the light pervious wall.

15. The bird cage as described in claim 1 wherein connectors releasably join the upper and lower base member enabling the lower base member to be separated from the cage for cleaning without disassembling the grilles, top wall and upper base member from one another.

16. A bird cage comprising
a base including a lower member having a bottom wall and peripheral side wall and a rim,
an upper base member forming part of the base and having a continuous side wall detachably mounted on and extending upwardly from the rim of the base member,
a connector mounted on the upper base member for releasably engaging the rim of the lower member to hold the members together,
connectors formed in the upper base member,
wire grilles extending upwardly from the sides of the upper base member and releasably engaged by the connectors to hold the grilles in side-by-side relationship,
and a top frame formed with yet additional connectors for detachably mounting the top frame on the upper ends of the wire grilles,
whereby the upper and lower base members, wire grilles and top frame may all be assembled and disassembled without tools or additional fasteners.

17. The bird cage described in claim 16 wherein the upper base member is made of a light impervious plastic.

18. The bird cage as described in claim 17 wherein the base members and top frame are made of plastic.

19. The bird cage as described in claim 18 wherein the footprint of the rim of the base member is greater than the footprint defined by the grilles.

* * * * *